A. D. CARMICHAEL.
PROCESS OF SULFATIZING ORES.
APPLICATION FILED NOV. 3, 1914.
1,124,696.
Patented Jan. 12, 1915.
2 SHEETS—SHEET 1.
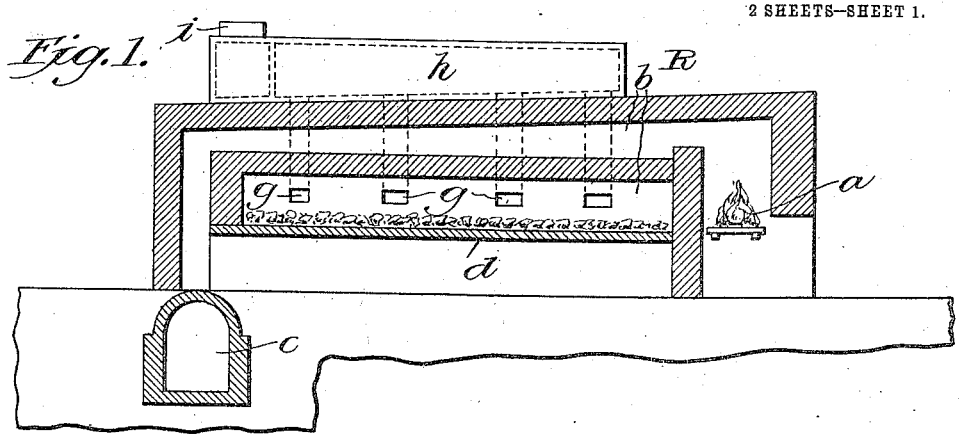
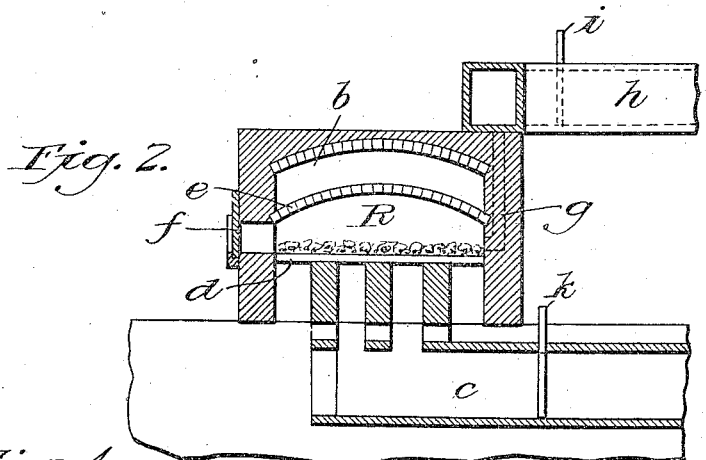
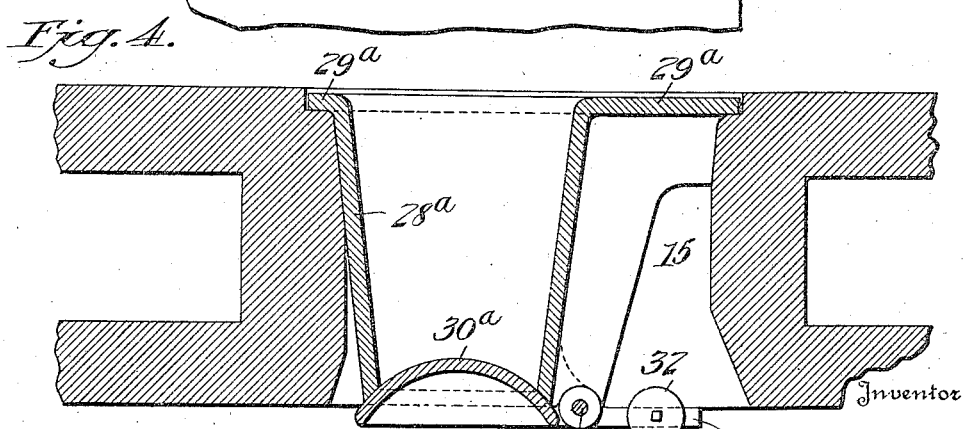
Witnesses
T. L. Kochran
E. Leckert
Inventor
Archibald D. Carmichael
By Henry Orth Jr.
Attorney

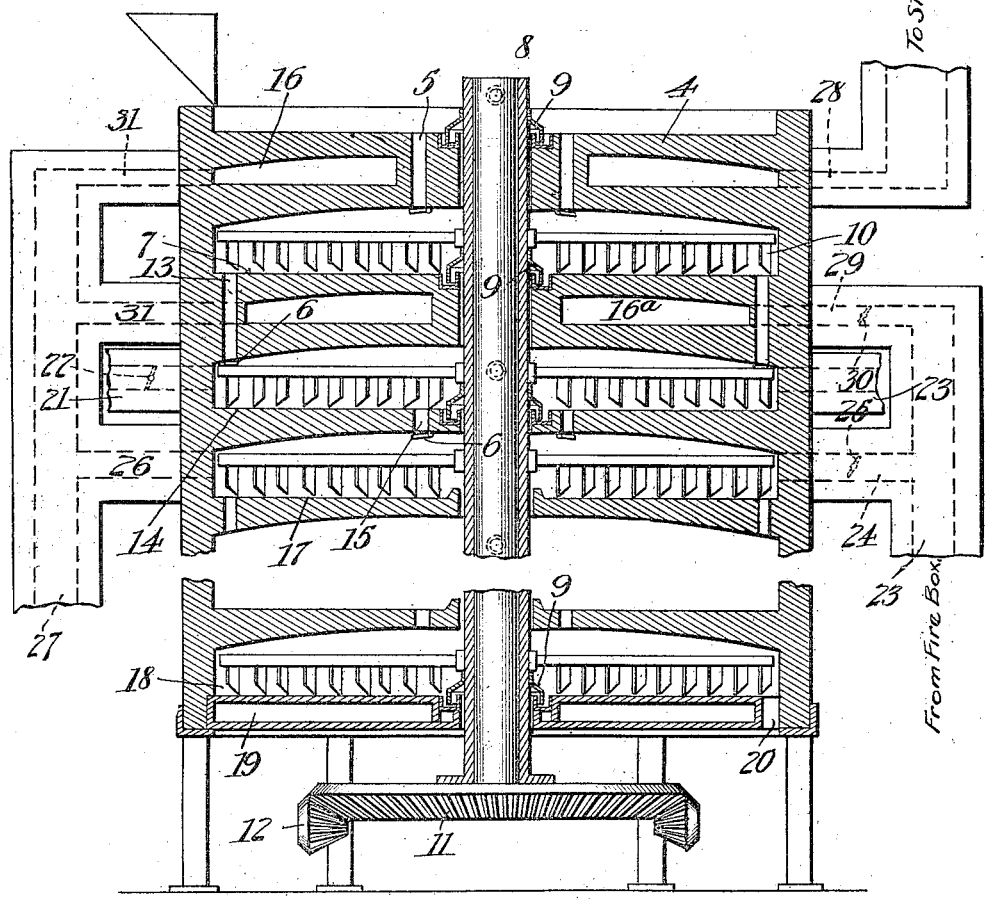

UNITED STATES PATENT OFFICE.

ARCHIBALD D. CARMICHAEL, OF WEST NORFOLK, VIRGINIA, ASSIGNOR OF ONE-THIRD TO HENRY SCHUYLER MONTGOMERY, OF NORFOLK, VIRGINIA.

PROCESS OF SULFATIZING ORES.

1,124,696.     Specification of Letters Patent.     Patented Jan. 12, 1915.

Application filed November 3, 1914. Serial No. 870,120.

*To all whom it may concern:*

Be it known that I, ARCHIBALD D. CARMICHAEL, a subject of the King of Great Britain, residing at West Norfolk, Norfolk county, Virginia, United States of America, have invented certain new and useful Improvements in Processes of Sulfatizing Ores; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a process of sulfatizing ores, and more especially to the sulfatizing of ores containing copper, the sulfatizing process having for its object to convert the copper content, in whatever form, into sulfate of copper preparatory to a leaching step for the electrolytic extraction of copper. Such ores may be primarily sulfid ores either lean or rich in sulfur, mixed oxid and sulfid ores, or oxid ores to which sulfur has been added in any suitable manner, either as such, or as a sulfid.

It being assumed that the charge of ore to be treated has at least or slightly more sulfur than is sufficient to convert the copper content into sulfate of copper, I proceed as follows: The ore is first heated, out of contact with the air, to a temperature between 500° and 700° C., this being such a temperature as will prevent the formation of sulfate of iron, should any iron be present. The heated ore is then exposed to the air, preferably, but not necessarily, heated air, for oxidation; the reaction being strongly exothermic the temperature rises considerably, thereby causing metallic copper, if such be present, and the copper oxids or silicates to be converted into sulfate of copper, and at the same time preventing the formation of sulfate of iron, and converting any iron which may be present into oxid, insoluble in the leaching liquor.

The addition of sulfur may be effected in any suitable manner, and I do this either by adding raw sulfur, rich sulfid ores, or iron pyrites in a quantity sufficient to bring the total content of sulfur in the mix in excess of the theoretical quantity required to convert the copper content, in whatever form it occurs, into sulfate, and thereby insure proper sulfatizing. The excess of sulfur over the theoretical amount at the same time should be sufficient to compensate for any irregularity constant of the particular furnace used for the roasting.

The advantage of this process is as follows: In roasting copper ore containing sulfur, and which ordinarily is low in sulfur, it has not been possible to obtain sufficient sulfurous acid gas, $SO_2$, to make acid, as this gas has been present to too small an extent to warrant the recovery of the gas. In other words, the gases evolved during oxidizing roasting are too dilute for any practical purpose. The reason of this is that sulfur vapor, or $SO_2$ gradually evolves during the entire time that the body of the ore is heating up to the temperature required for the decomposition of the sulfid, and is also due to the fact that all parts of the mix do not heat simultaneously, there being some parts evolving gas while others are comparatively cold.

I have found that by heating the mix until the entire mass is heated to the proper temperature for the oxidation of the sulfur and then suddenly oxidizing the mass before discharging it from the furnace, that I can obtain a yield of gas from an ore poor in sulfur that is as rich as gas from ores carrying large percentages of sulfur, that is to say, I cause all sulfur, as nearly as may be, to be converted into $SO_2$ at the same time, thereby heating up the mass to a higher temperature due to the oxidation, and rapidly and quickly converting whatever iron content there may be in the ore into oxid and practically prevent the formation of sulfate of iron as a transition compound to its conversion into oxid.

The process may be carried out in any suitable furnace provided with means for excluding the air from the ore during the first or heating stage and subsequently admitting air to the ore after the ore has been heated.

In the accompanying drawings, I have shown two types of furnace suitable for carrying out my process in which—

Figure 1 is a longitudinal section, Fig. 2 a cross section of Fig. 1 of an intermittent furnace, while Fig. 3 is a vertical section of a well known type of continuously operating furnace. Fig. 4 is a detailed sectional view of an automatic valve.

Referring to Figs. 1 and 2, $a$ is the source of heat, the flames and gases from which pass through a flue $b$ over and beneath the roasting chamber R to a stack flue $c$. $d$ is the roasting hearth, $e$ is an arch forming the bottom of flue $b$ and separating the heating gases from the ore being roasted on the hearth $d$ in the chamber R. At one side of the hearth $d$ are the charging doors and air inlets $f$, while on the opposite side of the hearth are flues $g$ that are common to a collector or gas conduit flue $h$ leading to a suitable apparatus for recovering the gas. This flue is provided with a damper $i$. The chimney flue $c$ is also provided with a damper $k$ for regulating the draft of the fire. In practice a battery of such furnaces is connected to flue $h$. The operation in connection with such a furnace is that the ore is charged through the charging doors $f$ on the hearth $d$, the damper $i$ is closed and the doors $f$ are closed so that the charge containing sufficient sulfur, either sulfids or otherwise, is heated to oxidizing and sulfatizing temperature. The furnace is thus operated as a muffle furnace. After the charge has been heated, the damper $i$ and doors $f$ are then set to give the necessary draft of air over the charge on hearth $d$ to effect the sulfatizing action. The excess of sulfur is oxidized and given off as sulfurous anhydrid, $SO_2$.

It is of course understood that the charge contains sulfur in excess of that required to produce sulfate of copper and this excess is used to insure all parts of the charge being properly sulfatized.

During the oxidation of the sulfur, the ore is rabbled in accordance with the progress of the oxidation. Such a furnace operates successfully and is advantageous for small plants but for large plants continuous operation is desired and to this end I have modified a well known type of furnace so as to produce the results I desire to obtain.

The furnace shown in Fig. 3 is a modified Wedge or MacDougall furnace, provided with several chambers one above the other. The top of the furnace is provided with a drier hearth 4 from which the ore drops through ore drop holes located alternately at the center and sides of successive furnace chambers. The drop holes 5 are controlled by automatic valves 6, and discharge onto the heating hearth 7 of the muffle chamber where the ore is heated during the exclusion of air. Passing vertically through the furnace is a shaft 8 provided with luting devices 9 to prevent the passage of gas from one furnace chamber to another where it is necessary or advisable to exclude air. This shaft carries rabbles 10, one or more in each chamber, and is rotated by a suitable gearing indicated at 11, 12.

The rabbles in the muffle 7, transfer the ore as they rotate from the center to the outer edge, where it drops through ore drop holes 13 also controlled by automatic valves 6, onto the oxidizing hearth 14, the rabbles 10 in this hearth transfer the heated ore toward the center of hearth 14, where it drops through ore drop holes 15 controlled by automatic valves 6 onto another hearth 17, thence through one or more other hearths as desired, whereupon it drops onto the cooling hearth 18 cooled by water jacket 19, and is discharged at 20, by the rabble 10 therein.

Between the drying hearth 4 and the muffle hearth 7 and also between the muffle hearth 7 and the oxidizing hearth 14, are heating flues 16 built in the brick work of the furnace that heat the top and bottom of the muffle. The oxidizing hearth requires no heating flue as the ore is delivered to this hearth, hot, and the oxidation of the sulfur will maintain sufficient heat to effect the reactions taking place on this hearth.

The hearth 14 is provided with an air inlet 21 controlled by a valve 22 and a gas outlet 23. The valves 6 are automatic in their action and prevent the gases from muffle chamber 7 from escaping through the ore-drop holes 5 through the ore on the dryer hearth to the atmosphere. The valves in the oxidizing chamber prevent air from rising through the ore drop holes 13 into the heating chamber 7 and oxidizing the ore therein before it is sufficiently hot for entrance into the oxidizing chamber. The valves controlling the drop holes 15 prevent air and gases from a subsequent chamber 17 from rising into the oxidizing chamber, but they may be omitted if desired.

The ore delivered to hearth 17 is heated by furnace gases from a flue 23 that has a branch flue 24 controlled by a damper 25. The furnace gases pass over hearth 17 to an exit branch flue 26, delivering into a flue 27 that discharges into flue 16 which is connected by exit flue 28 to the stack.

The flue $16^a$ below the muffle hearth 7 is connected by branch flue 29 controlled by a damper 30 to the flue 23 from the fire box, and the furnace gases pass through this flue $16^a$ and branch flue 31 to the flue 27.

All hearths below the oxidizing hearth 17, except the lowermost one or cooling hearth 18, are connected to flues 23 and 27, so as to insure by open firing that all the ore has been oxidized.

I have stated that I may use hot air to oxidize the hot ore delivered to the oxidizing hearth 14. This air may be heated in any desired manner and supplied through pipe 21.

The valves 6, hereinbefore referred to, are clearly shown in Fig. 4, and comprise a casing $28^a$ having a rectangular or other suitable supporting flange $29^a$. The bottom of the casing is closed by a spherical valve $30^a$ hinged at 31ᵃ and urged to its seat by a weight 32 adjustable on an arm 33 of the valve.

I claim—

1. The process of producing a sulfatized roast which consists in heating a charge of ore under non-oxidizing conditions and containing sufficient sulfur to convert the desired values into sulfates, to a temperature sufficient to cause the formation of such sulfates and then admitting air to such heated charge to suddenly convert the values into sulfates by the oxidation of the sulfur content of the charge.

2. The process of producing a sulfatized roast, which consists in heating a charge of ore, under non-oxidizing conditions and containing sufficient sulfur to convert the desired values into sulfates, to a temperature sufficient to cause the formation of such sulfates, and then admitting heated air to such heated charge to suddenly convert the values into sulfates by the oxidization of the sulfur content of the charge, and to obtain a maximum of sulfurous acid gas.

3. The process of producing a sulfatized roast, which comprises continuously supplying ore to a non-oxidizing chamber, and continuously passing such ore through said chamber and thereby heating the ore to a high temperature, and continuously discharging the ore into an oxidizing chamber to suddenly oxidize the heated ore to obtain a maximum yield of sulfurous acid.

4. The process of producing a sulfatized roasted ore which comprises heating the ore to a temperature sufficient to cause the decomposition of iron sulfate in substantially a non-oxidizing atmosphere and then admitting air to the ore, thereby oxidizing sulfur, converting the copper content into sulfate and the iron content into oxid.

5. The process of producing a sulfatized roasted ore, which comprises heating the ore to a temperature sufficient to cause the decomposition of iron sulfate in a substantially non-oxidizing atmosphere and then admitting heated air to the ore, thereby oxidizing sulfur and converting the copper content into sulfate and the iron content into oxid.

In testimony that I claim the foregoing as my invention, I have signed my name in presence of two subscribing witnesses.

ARCHIBALD D. CARMICHAEL.

Witnesses:
R. S. COHOON,
E. T. RUMMELL.